US012457416B2

(12) United States Patent
Maruyama et al.

(10) Patent No.: US 12,457,416 B2
(45) Date of Patent: Oct. 28, 2025

(54) CONTROL APPARATUS, CONTROL METHOD, AND STORAGE MEDIUM STORING PROGRAM

(71) Applicant: CANON KABUSHIKI KAISHA, Tokyo (JP)

(72) Inventors: Naoki Maruyama, Tokyo (JP); Junya Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 18/425,418

(22) Filed: Jan. 29, 2024

(65) Prior Publication Data

US 2024/0267620 A1 Aug. 8, 2024

(30) Foreign Application Priority Data

Feb. 2, 2023 (JP) ................................. 2023-014771

(51) Int. Cl.
*H04N 23/67* (2023.01)
*H04N 23/611* (2023.01)

(52) U.S. Cl.
CPC ......... *H04N 23/675* (2023.01); *H04N 23/611* (2023.01)

(58) Field of Classification Search
CPC .... H04N 23/71; H04N 23/611; H04N 23/635; H04N 23/675; H04N 23/673; H04N 23/672
USPC ....................................................... 348/349
See application file for complete search history.

(56) References Cited

U.S. PATENT DOCUMENTS

| | | | |
|---|---|---|---|
| 8,121,404 B2 * | 2/2012 | Xiao ..................... | G03B 7/091 |
| | | | 358/1.9 |
| 8,682,040 B2 * | 3/2014 | Tsuji .................... | G06V 40/161 |
| | | | 382/118 |
| 8,818,055 B2 * | 8/2014 | Tsuji .................... | H04N 23/611 |
| | | | 382/118 |
| 9,363,431 B2 * | 6/2016 | Rav-Acha ............ | H04N 23/611 |
| 9,521,320 B2 * | 12/2016 | Tsutsumi ............. | H04N 23/635 |
| 9,848,159 B2 * | 12/2017 | Nakase ................ | H04N 23/667 |
| 10,708,486 B2 * | 7/2020 | Lee ....................... | H04N 23/632 |
| 12,141,999 B2 * | 11/2024 | Inagaki ..................... | G06T 7/70 |
| 2008/0199056 A1 * | 8/2008 | Tokuse .................. | H04N 23/61 |
| | | | 382/118 |
| 2012/0307101 A1 * | 12/2012 | Fukuya ................ | H04N 23/611 |
| | | | 348/222.1 |
| 2013/0314562 A1 * | 11/2013 | Shibuya ................ | H04N 23/62 |
| | | | 348/222.1 |
| 2014/0354781 A1 * | 12/2014 | Matsuyama ......... | H04N 25/134 |
| | | | 348/49 |

(Continued)

FOREIGN PATENT DOCUMENTS

| | | |
|---|---|---|
| JP | 2010183200 A | 8/2010 |
| JP | 2013025719 A | 2/2013 |

*Primary Examiner* — Pritham D Prabhakher
(74) *Attorney, Agent, or Firm* — Canon U.S.A., Inc. IP Division

(57) ABSTRACT

A control apparatus includes one or more memories storing instructions, and one or more processors that, upon execution of the stored instructions, are configured to perform determination processing to determine a focus degree of each of two or more partial areas in a captured image acquired by a camera, and select, based on the determined focus degree of each of the two or more partial areas, a subject detection area in the captured image acquired by the camera.

13 Claims, 12 Drawing Sheets

(56) References Cited

U.S. PATENT DOCUMENTS

| | | | | |
|---|---|---|---|---|
| 2015/0016693 A1* | 1/2015 | Gattuso | ................. | G06V 40/16 |
| | | | | 382/118 |
| 2015/0189221 A1* | 7/2015 | Nakase | ................. | H04N 5/772 |
| | | | | 386/225 |
| 2015/0281566 A1* | 10/2015 | Rav-Acha | .............. | H04N 23/70 |
| | | | | 348/222.1 |
| 2016/0134807 A1* | 5/2016 | Tsutsumi | ............. | H04N 23/959 |
| | | | | 348/222.1 |
| 2016/0182830 A1* | 6/2016 | Hu | ........................ | H04N 23/62 |
| | | | | 348/231.6 |
| 2019/0253608 A1* | 8/2019 | Lee | ...................... | H04N 23/959 |
| 2022/0366595 A1* | 11/2022 | Inagaki | ............... | H04N 23/959 |

* cited by examiner

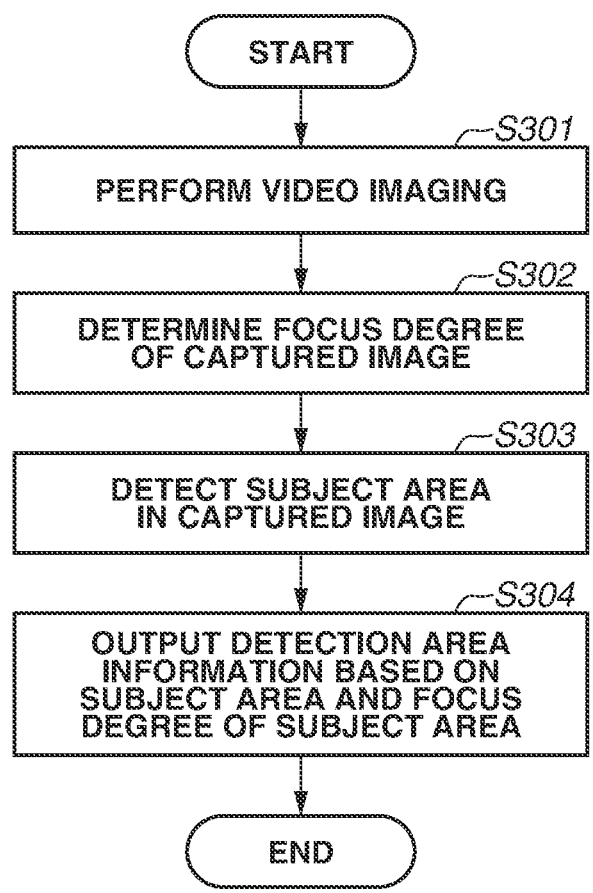

410

420

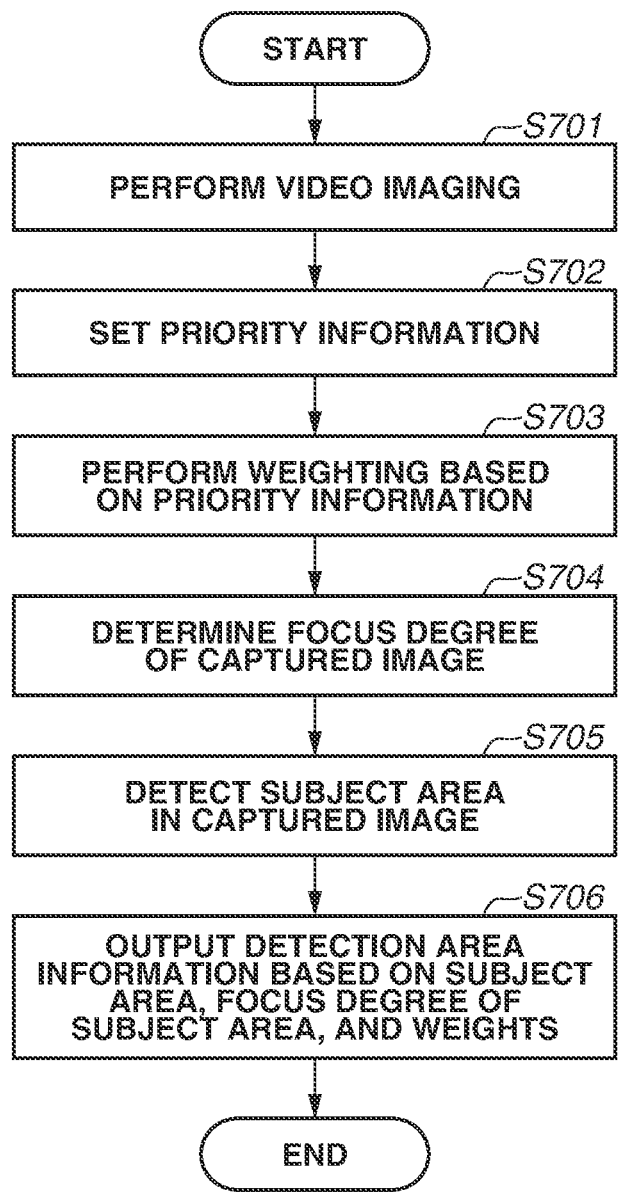

CONTROL APPARATUS, CONTROL METHOD, AND STORAGE MEDIUM STORING PROGRAM

BACKGROUND OF THE DISCLOSURE

Field of the Disclosure

The present disclosure relates to a subject detection method.

Description of the Related Art

There are systems for identifying target items from captured images. An example is a face authentication system for detecting persons from captured images and authenticating the persons to check whether the persons are registered. Since it takes time to complete a recognition process if the persons are processed individually, simultaneous authentication of a plurality of persons is demanded in the authentication system. Further, since a required recognition accuracy is generally lower in detecting a target item than in authenticating a target item, there have been cases where, for example, a face is successfully detected but cannot be authenticated. Further, in a case where there is an upper limit on the number of subjects that can be detected, if detected subjects are mostly subjects without a sufficient accuracy for authentication, an issue arises that other subjects that could have been authenticated successfully cannot be detected.

Regarding the above-described issue, Japanese Patent Application Laid-Open No. 2013-025719 discusses a technique for narrowing down detection targets to prioritize by selecting detection targets based on face size in a system for detecting faces from captured images. Further, Japanese Patent Application Laid-Open No. 2010-183200 discusses a technique for narrowing down face detection target areas by excluding, from face detection targets, areas where focus cannot be achieved due to the hardware configuration of a mobile terminal with an imaging function.

However, there is still a possibility of detecting a subject that is unsuitable for authentication processing. For example, with the technique discussed in Japanese Patent Application Laid-Open No. 2013-025719, since detection targets are selected based on face size, there is a possibility that a subject with a large face size and insufficient image quality is detected as an authentication processing target. Further, even with the technique discussed in Japanese Patent Application Laid-Open No. 2010-183200, there is a possibility that a subject that is unsuitable for authentication processing is continuously detected as an authentication processing target in a case where a detection area that is set based on hardware limitations has insufficient image quality.

SUMMARY OF THE DISCLOSURE

A control apparatus includes one or more memories storing instructions, and one or more processors that, upon execution of the stored instructions, are configured to perform determination processing to determine a focus degree of each of two or more partial areas in a captured image acquired by a camera, and select, based on the determined focus degree of each of the two or more partial areas, a subject detection area in the captured image acquired by the camera.

Further features of the present disclosure will become apparent from the following description of exemplary embodiments with reference to the attached drawings.

BRIEF DESCRIPTION OF THE DRAWINGS

FIG. 3 is a flowchart illustrating an example of a process by the imaging apparatus according to the first exemplary embodiment.

FIG. 7 is a flowchart illustrating an example of a process by the imaging apparatus according to the first exemplary embodiment.

DESCRIPTION OF THE EMBODIMENTS

Various exemplary embodiments of the present disclosure will be described below with reference to the drawings.

Figure 1:
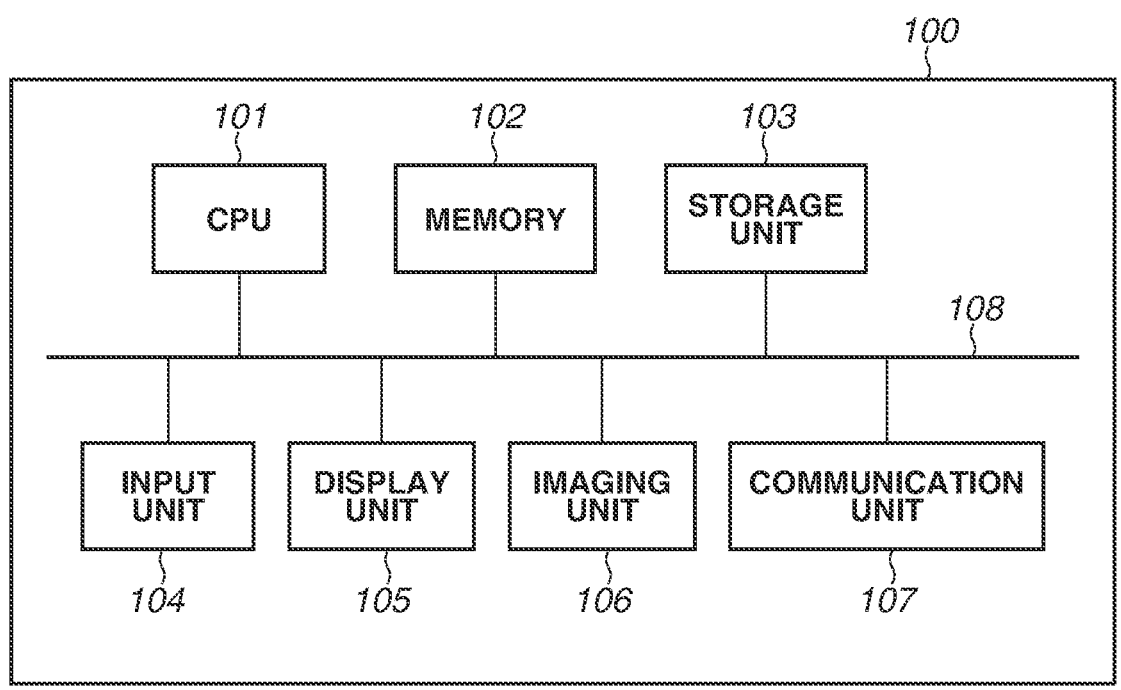
FIG. 1 is a diagram illustrating an example of a hardware configuration of an imaging apparatus.

FIG. 1 is a block diagram illustrating an example of a hardware configuration of an imaging apparatus to which a control apparatus according to a first exemplary embodiment is applied. An imaging apparatus 100 includes a central processing unit (CPU) 101, a memory 102, a storage unit 103, an input unit 104, a display unit 105, an imaging unit 106, a communication unit 107, and a bus 108. The CPU 101, the memory 102, the storage unit 103, the input unit 104, the display unit 105, the imaging unit 106, and the communication unit 107 are connected to communicate with each other via the bus 108. The imaging apparatus 100 can further include components other than the foregoing components.

The CPU 101 controls the entire imaging apparatus 100. The CPU 101 controls, for example, operations of functional units connected via the bus 108. The memory 102 stores programs and various data for use in processing by the CPU 101. The memory 102 also has functions as a main memory of the CPU 101 and a work area. The CPU 101 performs processing based on programs stored in the memory 102 to thereby realize below-described functions and processes of the imaging apparatus 100. The functions and processes of the imaging apparatus 100 can be realized using a processor other than a CPU. For example, a graphics processing unit (GPU) can be used in place of a CPU.

The storage unit 103 stores, for example, various data for use in performing processing based on programs performed by the CPU 101. The storage unit 103 also stores, for example, various data acquired by performing processing based on programs by the CPU 101. The storage unit 103 can also store programs and various data for use in processing by the CPU 101. The input unit 104 includes operational members such as buttons or switches and inputs user operations to the imaging apparatus 100. The display unit 105 includes a display member such as a liquid crystal display and displays processing results by the CPU 101 and captured images. The imaging unit 106 images subjects and generates images. The communication unit 107 connects the imaging apparatus 100 to networks and controls communication with other apparatuses.

Figure 2:
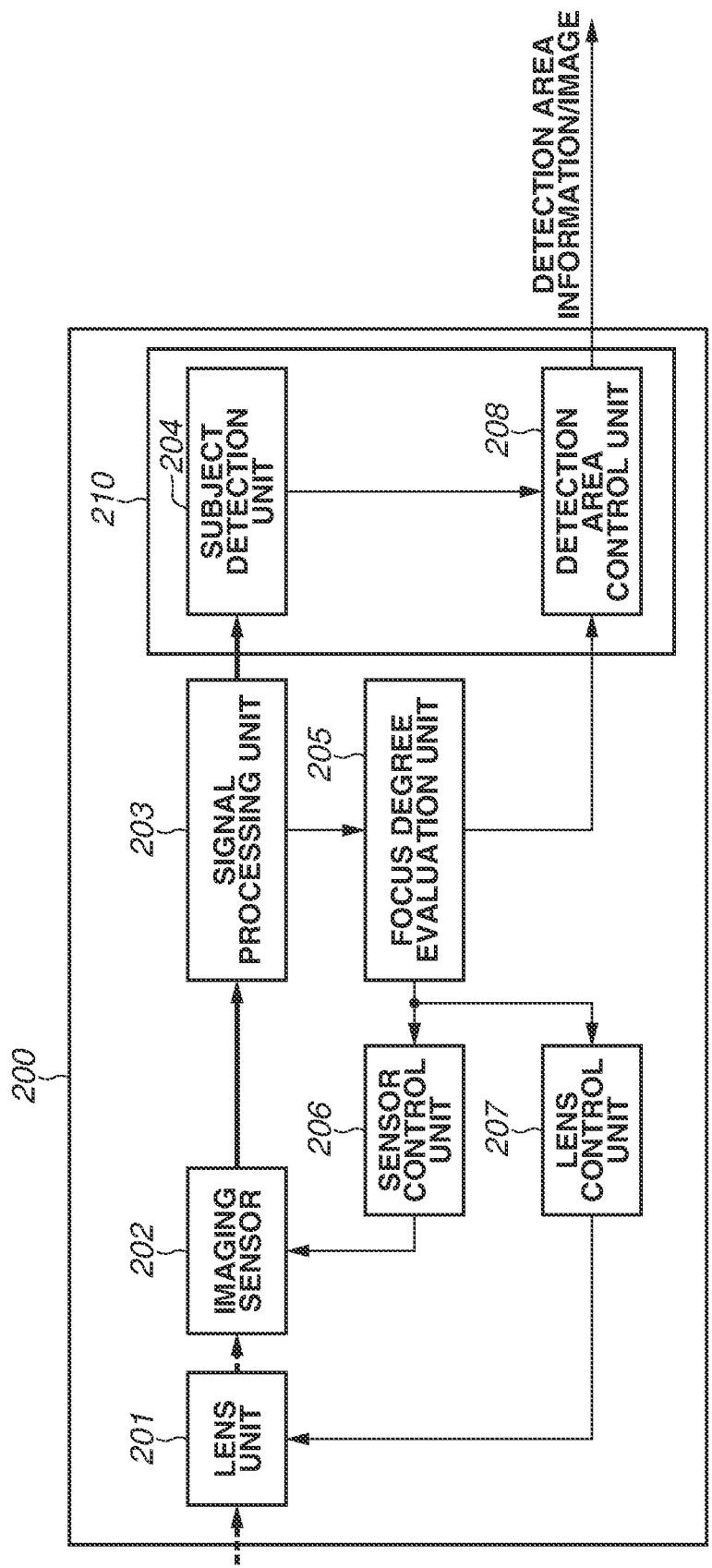
FIG. 2 is a diagram illustrating an example of a functional configuration of an imaging apparatus according to a first exemplary embodiment.

FIG. 2 is a block diagram illustrating an example of a functional configuration of an imaging apparatus to which a control apparatus according to the present exemplary embodiment is applied. An imaging apparatus 200 includes a lens unit 201, an imaging sensor 202, a signal processing unit 203, a subject detection unit 204, a focus degree evaluation unit 205, a sensor control unit 206, a lens control unit 207, and a detection area control unit 208. The imaging apparatuses 100 and 200 according to the present exemplary embodiment are the same apparatus.

The lens unit 201 includes a lens unit including a focus lens and a zoom lens and an aperture mechanism. The lens unit 201 converges incident light from a subject and forms an optical image on an image sensing surface of the imaging sensor 202. The imaging sensor 202 is an image sensor, such as a complementary metal-oxide semiconductor (CMOS) sensor and a charge-coupled device (CCD) sensor, that converts light into an electric signal and generates an imaging signal. The imaging signal generated by the imaging sensor 202 is output to the signal processing unit 203. The signal processing unit 203 performs various types of signal processing and image processing on the imaging signal output from the imaging sensor 202 and generates an image (captured image). The signal processing unit 203 can be formed using a dedicated circuit block (e.g., a video image engine) for performing predetermined image processing.

The subject detection unit 204 performs subject detection processing on the captured image generated by the signal processing unit 203 to detect target subjects in the captured image and outputs a detection result to the detection area control unit 208. The detection result output by the subject detection unit 204 includes, for example, information indicating an area of a detected subject (hereinafter, also referred to as "subject area") (e.g., coordinate information for identifying the subject area). The subject detection can be performed using an existing publicly known method, such as a subject detection method using template matching or deep learning. According to the present exemplary embodiment, as an example, faces are detection target subjects, and the subject detection unit 204 performs face detection.

The focus degree evaluation unit 205 evaluates focus degrees, which indicate degrees of focus, of the captured image generated by the signal processing unit 203 and outputs evaluation information about the focus degrees of the captured image to the detection area control unit 208. The focus degree evaluation unit 205 is an example of a determination unit. Hereinafter, focus degrees are expressed as numerical values as an example, and a greater numerical value corresponds to a more focused state. The focus degree evaluation unit 205 performs various evaluations related to camera control, such as brightness and focus degree of the captured image, and based on the evaluation results, the sensor control unit 206 controls the imaging sensor 202, and the lens control unit 207 controls the lens unit 201.

The detection area control unit 208 selects a subject detection area in the captured image, based on the evaluation information about the focus degrees of the captured image from the focus degree evaluation unit 205. The detection area control unit 208 outputs detection area information specifying the selected subject detection area, together with the image. The detection area control unit 208 is an example of a selection unit. The detection area control unit 208 selects a subject detection area from the subject areas specified by the subject detection results to output detection area information, based on the focus degrees of partial areas corresponding to the subject areas that are specified by the evaluation information about the focus degrees.

The detection area control unit 208 selects, for example, a subject area with a higher focus degree of a portion corresponding to the area than a predetermined threshold from among the subject areas detected by the subject detection unit 204 as a subject detection area. In a case where the number of subject areas detected by the subject detection unit 204 has not exceeded a predetermined limit value (e.g., an upper limit value of the number of detected subjects), all detected subject areas can also be selected as a subject detection area regardless of focus degree. In a case where the number of subject areas with a higher focus degree of a corresponding portion in the captured image than the predetermined threshold is greater than a predetermined limit value (e.g., the upper limit value of the number of detected subjects), a predetermined number of subject areas can be selected in decreasing order of focus degree as a subject detection area. In a case where the number of subject areas with a higher focus degree of a corresponding portion in the captured image than the predetermined threshold is greater than the predetermined limit value (e.g., the upper limit value of the number of detected subjects), a predetermined number of subject areas can be selected as a subject detection area based on positions in the captured image.

FIG. 3 is a flowchart illustrating an example of the subject detection processing performed by the imaging apparatus according to the first exemplary embodiment.

In step S301, the imaging apparatus 100 performs video imaging. In the video imaging in step S301, the imaging sensor 202 photoelectrically converts an optical image formed by the lens unit 201 and generates an imaging signal, and the signal processing unit 203 performs image processing on the generated imaging signal to generate a captured image.

In step S302, the focus degree evaluation unit 205 determines focus degrees of the captured image generated by the video imaging in step S301. The focus degree evaluation unit 205 acquires a focus degree for each area (two or more partial areas) in the captured image and outputs the acquired focus degree to the detection area control unit 208.

In step S303, the subject detection unit 204 performs subject detection processing on the captured image generated in the video imaging in step S301 to detect subject areas in the captured image.

The subject detection unit 204 outputs a detection result specifying detected subject areas in the captured image to the detection area control unit 208.

In step S304, the detection area control unit 208 selects a subject detection area in the captured image based on the focus degrees of the areas in the captured image that are acquired in step S302 and the subject areas in the captured image that are detected in step S303. The detection area control unit 208 generates detection area information specifying the subject detection area based on the detected subject areas in the captured image and the focus degrees of the subject areas, and outputs the generated detection area information together with the image.

In the process illustrated in FIG. 3, the processing of step S302 and the processing of step S303 are to be completed before the processing of step S304 is started. The processing of step S302 and the processing of step S303 can be performed in any order. For example, the processing of step S302 can be performed after the processing of step S303 is performed, or the processing of step S302 and the processing of step S303 can be performed simultaneously.

Figure 4A:
FIGS. 4A to 4C are diagrams illustrating determination of focus degrees of a captured image.
Figure 4B:
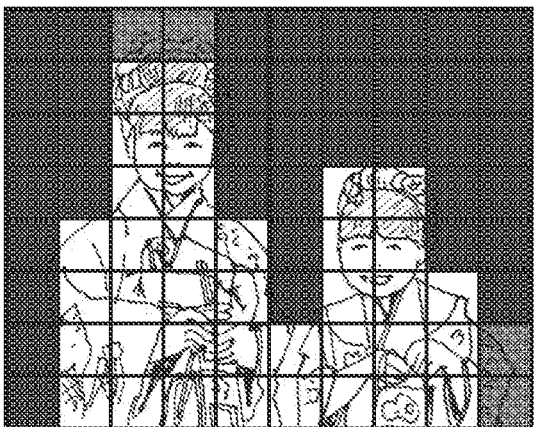

The determination of focus degrees of a captured image will now be described with reference to FIGS. 4A to 4C. FIG. 4A illustrates a captured image 410. FIG. 4B schematically illustrates a focus degree of each area (each of two or more partial areas) in an imaging area 420. A focus degree of an area herein refers to the reliability of the video image in the area and can be calculated based on, for example, a contrast value, distance information, a pattern matching degree, attribute information about a detection target object, or a combination thereof. The attribute information about the detection target object includes, for example, information acquired based on at least one of a size, sex, age, color, shape, moving direction, and brightness of the detection target object.

FIG. 4B illustrates an example of a method of dividing an imaging area into predetermined sizes as a method for setting focus degree determination target areas. The imaging area 420 is divided into a plurality of areas of the predetermined size, and a focus degree is calculated for each area. In FIG. 4B, the focus degrees of the areas are represented with shades of color for convenience, and a darker shade corresponds to a lower focus degree. After the focus degrees of the areas in the imaging area 420 are calculated as illustrated in FIG. 4B, the detection area control unit 208 selects a subject detection area based on the focus degrees of the areas in the captured image that correspond to the subject areas detected by the subject detection unit 204.

Figure 4C:
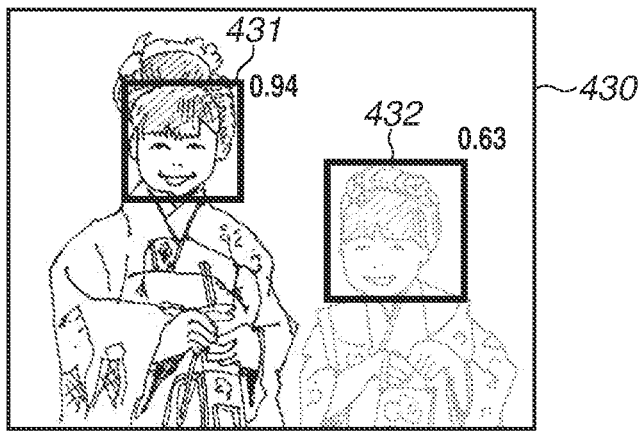

As another example of a method of setting focus degree determination target areas, a focus degree of each subject area detected by the subject detection unit 204 can be calculated as illustrated in FIG. 4C. In the example illustrated in FIG. 4C, focus degrees of two subject areas 431 and 432 detected in a captured image 430 are calculated, and the subject area 431 is displayed with a focus degree of 0.94 while the subject area 432 is displayed with a focus degree of 0.63. In the example illustrated in FIG. 4C, the values of the focus degrees are normalized, and a value closer to 1 corresponds to a more focused state. For example, if areas with a focus degree value of 0.7 or less are unsuitable for subsequent processing (e.g., recognition process), a focus degree threshold for selecting a subject detection area is set to 0.7, and the detection area control unit 208 selects only the subject area 431 with the value greater than 0.7 as a subject detection area.

The imaging apparatus according to the first exemplary embodiment determines image quality of subject areas based on detection results of detection target subjects in a captured image considering focus degrees of areas in the captured image, and selects a subject area that is suitable for subsequent processing (e.g., recognition process) as a subject detection area. As a result, highly accurate detection area information specifying a subject area with appropriate image quality in the captured image is output instead of simply outputting information about subject areas where a subject is detected. This increases the possibility of detecting a subject that is suitable for authentication processing.

The configuration of the imaging apparatus 200 described above includes the subject detection unit 204 and the detection area control unit 208 as an example. However, this is not limited thereto. For example, the subject detection unit 204 and the detection area control unit 208 can be configured as a subject detection apparatus 210 capable of communicating with the imaging apparatus 200 outside the imaging apparatus 200. The subject detection apparatus 210 can also include a functional unit configured to perform focus degree evaluation on captured images similarly to the focus degree evaluation unit 205 so that the focus degree evaluation related to the subject detection area selection can be performed by the subject detection apparatus 210.

In the above-described example according to the first exemplary embodiment, image quality of subject areas is determined considering focus degrees in the captured image, and a subject area that is more suitable for subsequent processing (e.g., recognition process) is selected as a subject detection area. There may be a case where it is effective to select a subject area preferentially as a detection target in selecting a subject detection area from among subject areas.

Figure 5:
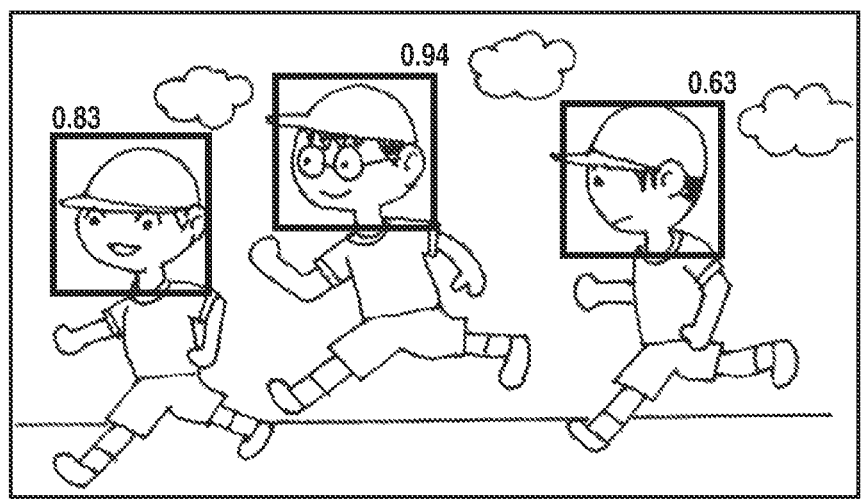
FIG. 5 is a diagram illustrating detection priorities.

For example, in a case where there is an upper limit on the number of subjects that can be processed in the detection process or the subsequent recognition process, it may be appropriate to select an area preferentially as a recognition target if the area is recognizable even if the area has a lower focus degree than other areas. As illustrated in FIG. 5, in a case where a plurality of persons enters an imaging range and moves from the right side toward the left side, unless processing is performed starting from the leftmost person, the leftmost person may be excluded from the imaging range, so that it is appropriate to consider not only whether image quality is high but also an area that is to be processed preferentially.

In a second exemplary embodiment, an example will be described in which a subject detection area is selected considering a priority. According to the second exemplary embodiment, a weight setting is set to a focus degree evaluation unit to adjust weights assigned to priorities related to the subject detection area selection. Possible examples of weight elements of priorities include:

travel direction,
focusing target neighborhood position (vicinity),
focusing target neighborhood position (distance), and
position.

In the case of the travel direction, for example, a user presets a travel direction to prioritize, and a detection target subject with high image quality (with predetermined image quality or higher) among detection target subjects moving in the preset direction in a captured image is preferentially selected as a detection target. As to the focusing target neighborhood position, an area with a high focus degree is detected in a captured image, and a subject in the vicinity of the detected area can be selected preferentially as a detection target.

An intended use case is a case of performing detection or recognition on a target object in the vicinity of an intended area or target in crowds. The vicinity in this case is intended to refer to a case where subject distances are substantially the same, a case of being nearby on the plane, or a concentric distance of a combination thereof. Further, weighs can be assigned based on positions in the captured image. For example, in a case where use in combination with an existing intrusion detection line on a captured image is considered, a method is possible of assigning a high priority to a position on a captured image while assigning lower priorities to greater distances from the position. This method of changing priority based on distance is also appliable to the above-described focusing target neighborhood position. Further, as to position information, priorities can be set with a position designated by a user as a center, and a subject detection area can be selected.

Figure 6:
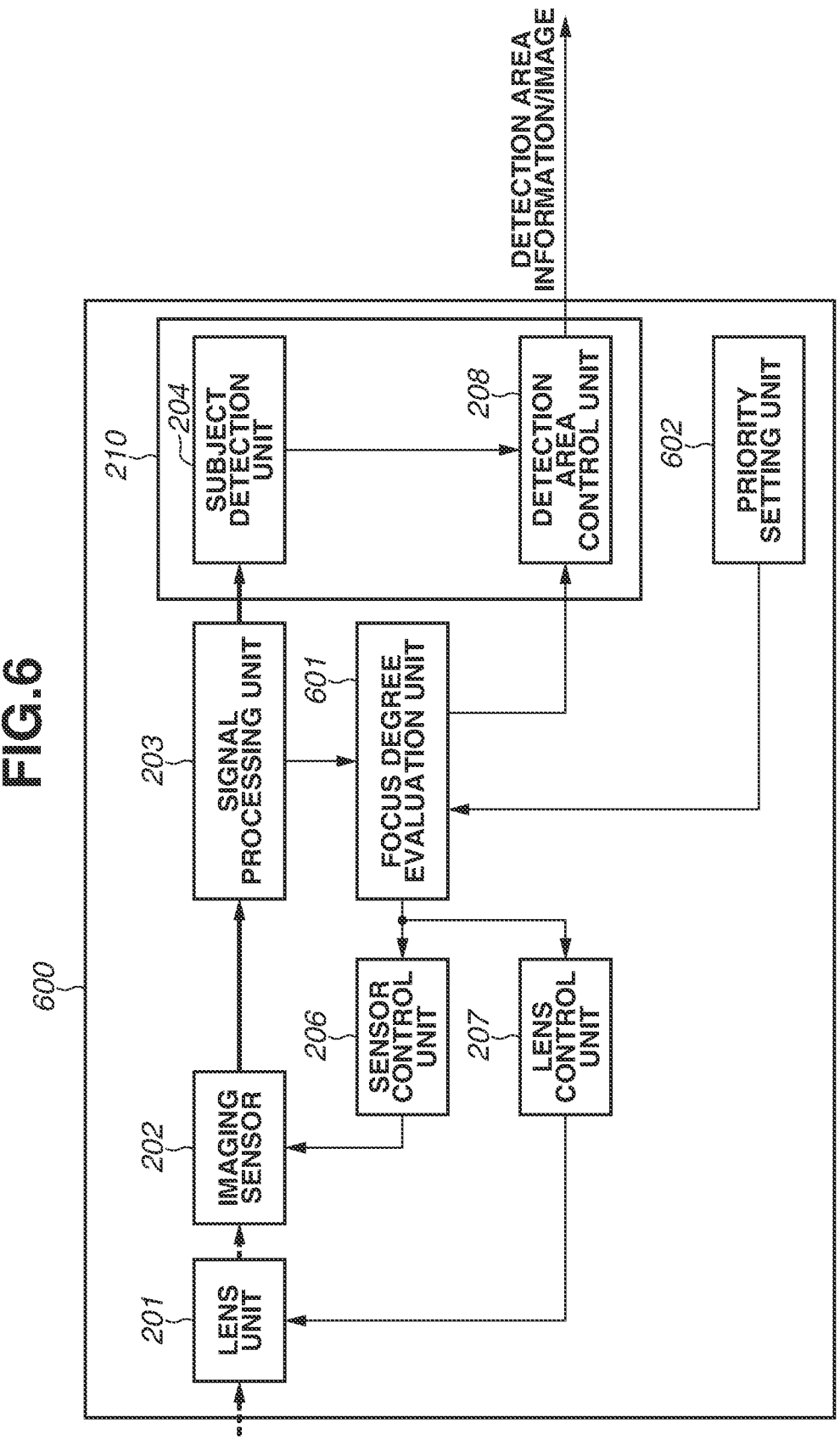
FIG. 6 is a diagram illustrating an example of a functional configuration of an imaging apparatus according to a second exemplary embodiment.

The imaging apparatus according to the second exemplary embodiment has a hardware configuration similar to that of the imaging apparatus according to the first exemplary embodiment, so that redundant descriptions thereof are omitted. FIG. 6 is a block diagram illustrating an example of a functional configuration of an imaging apparatus to which a control apparatus according to the second exemplary embodiment is applied. In FIG. 6, each component having a function similar to that of a component illustrated in FIG. 2 is given the same reference numeral as in FIG. 2, and redundant descriptions thereof are omitted. The imaging apparatus 600 includes the lens unit 201, the imaging sensor 202, the signal processing unit 203, the subject detection unit 204, the sensor control unit 206, the lens control unit 207, the detection area control unit 208, a focus degree evaluation unit 601, and a priority setting unit 602.

The focus degree evaluation unit 601 evaluates focus degrees of the captured image generated by the signal processing unit 203. The focus degree evaluation unit 601 also assigns weights to the focus degrees of the captured image based on priority information set by the priority setting unit 602, and outputs evaluation information about the weighted focus degrees to the detection area control unit 208. The focus degree evaluation unit 601 also performs various evaluations related to camera control, such as brightness and focus degree of captured image, and based on the evaluation results, the sensor control unit 206 controls the imaging sensor 202, and the lens control unit 207 controls the lens unit 201.

The priority setting unit 602 sets priority information about priorities in selecting a subject detection area. As described above, for example, a travel direction, a focusing target neighborhood position, and a position are set as priority information.

While the focus degree evaluation unit 601 assigns weights to focus degrees of a captured image based on the set priority information and outputs evaluation information about the weighted focus degrees to the detection area control unit 208 according to the present exemplary embodiment, this is not a limiting form. For example, instead of the focus degree evaluation unit 601 assigning weights to the focus degrees of the captured image, the detection area control unit 208 can receive the focus degrees of the captured image and weight information based on the priority information from the focus degree evaluation unit 601 to calculate weighted focus degrees.

FIG. 7 is a flowchart illustrating an example of the subject detection processing by the imaging apparatus according to the second exemplary embodiment.

In step S701, the imaging apparatus 600 performs video imaging. In the video imaging in step S701, the imaging sensor 202 photoelectrically converts an optical image formed by the lens unit 201 and generates an imaging signal. The signal processing unit 203 performs image processing on the generated imaging signal to generate a captured image.

In step S702, the priority setting unit 602 sets priority information about priorities for use in selecting a subject detection area based on input by a user.

In step S703, the focus degree evaluation unit 601 assigns weights to the priorities corresponding to the priority information, based on the priority information set by the priority setting unit 602 in step S702.

In step S704, the focus degree evaluation unit 601 determines focus degrees of the captured image generated by the video imaging in step S701.

In step S705, the subject detection unit 204 performs the subject detection processing on the captured image generated by the video imaging in step S701 to detect subject areas in the captured image.

In step S706, the detection area control unit 208 selects a subject detection area in the captured image based on the subject areas in the captured image that are acquired in the processing of the subject detection unit 204, and the focus degrees and the weights of the subject areas that are acquired in the processing of the focus degree evaluation unit 601. The detection area control unit 208 outputs detection area information specifying the selected subject detection area together with the image.

In the process illustrated in FIG. 7, the processing of step S703, the processing of step S704, and the processing of step S705 are to be completed before the processing of step S706 is started. The processing of step S703, the processing of S704, and the processing of S705 can be performed in any order. For example, the processing of step S704 can be performed after the processing of step S705 is performed, or part or all of the processing of step S703, the processing of step S704, and the processing of step S705 can be performed simultaneously.

Figure 8A:
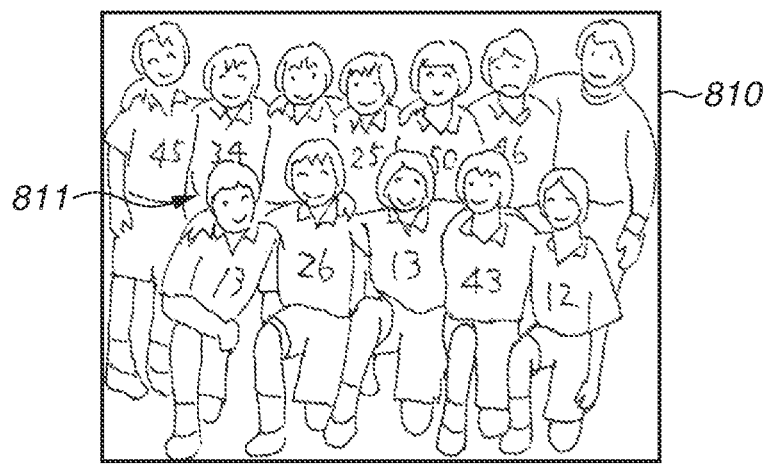
FIGS. 8A and 8B are diagrams illustrating priority settings for a captured image.
Figure 8B:
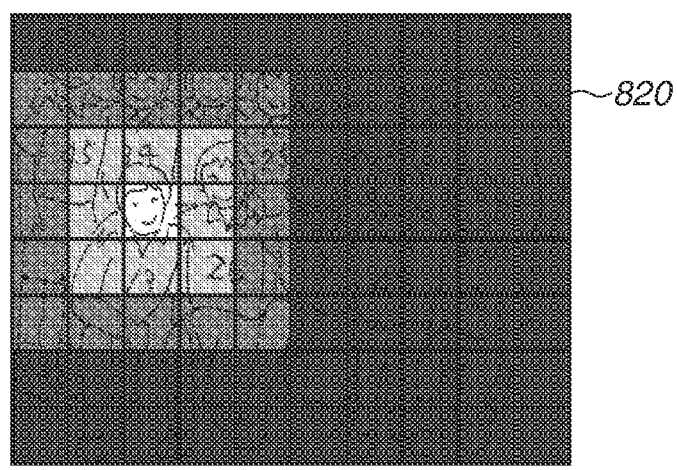

An example of setting priorities as described above will now be described with reference to FIGS. 8A and 8B. FIG. 8A illustrates an example of a captured image 810. The captured image 810 includes a plurality of persons, and in a case where, for example, a user selects a subject 811 from the captured image 810, priority coefficients (weight coefficients) are set with an area of the subject 811 as a center. FIG. 8B schematically illustrates priorities in the captured image. In FIG. 8B, the priorities are represented with shades of color. A darker shade corresponds to a lower priority. The priority decreases at greater distances from the selected subject 811 as the center. According to the present exemplary embodiment, a subject detection area is selected considering the priority coefficients (weight coefficients) and the focus degrees of the captured image. Thus, in a case where there is an area with a high focus degree at a great distance from the area of the selected subject 811, the area is excluded if the priority of the area is low. As an opposite idea, areas to exclude can also be set.

The imaging apparatus according to the second exemplary embodiment assigns weights to focus degrees of areas in a captured image based on priorities, determines image quality of subject areas in the captured image, and selects a subject area that is suitable for subsequent processing (e.g., recognition processing) as a subject detection area. This increases the possibility of detecting a subject that is suitable for authentication processing, as in the first exemplary embodiment. Further, it becomes possible to set an area to prioritize and then select a subject detection area, leading to enhancement of usability.

In the above-described configuration, the imaging apparatus 600 includes the subject detection unit 204 and the detection area control unit 208. This, however, is not a limiting configuration. For example, the subject detection unit 204 and the detection area control unit 208 can be configured as a subject detection apparatus 210 capable of communicating with the imaging apparatus 600 outside the imaging apparatus 600. Alternatively, the subject detection apparatus 210 can include a functional unit configured to perform focus degree evaluation on captured images and the priority setting unit 602, and the focus degree evaluation related to the subject detection area selection can be performed by the subject detection apparatus 210.

In the first and second exemplary embodiments, a focus area is fixed. In a third exemplary embodiment, an example will be described where subject detection processing and recognition processing (authentication processing) are performed while changing the focus area. An imaging apparatus (camera) performs flange back adjustment to change positions of a focus lens of a lens unit and an imaging sensor for focus position adjustment. With this focus adjustment mechanism, it becomes possible to perform focus position adjustment on subjects at different distances to improve focus conditions of the subjects. It thereby becomes possible to adjust the focus states of the subjects to a suitable state in a detection target area.

For example, by acquiring distance information about a subject, it becomes possible to select a detection target area (distance), designate the selected detection target area (distance), detect the subject in a suitable focus state, and perform recognition processing (authentication processing). The distance information about the subject can be acquired, for example, based on the position of the focus lens, a method using a phase difference sensor or a phase difference in a sensor plane, or a distance measurement device. By setting a target distance (focus position) as described above, the subject detection is limited within the detection target area, and this makes it possible to reduce unintended detection and recognition of subjects outside the target area. In a case where focus operations by focus adjustment can be performed at high speed or in a case where a focus search range (imaging distance) is sequentially changed, a next focus target is selected after the recognition processing at a focusing target position is ended. This makes it possible to perform the determination in a state with high recognition accuracy.

Figure 9:
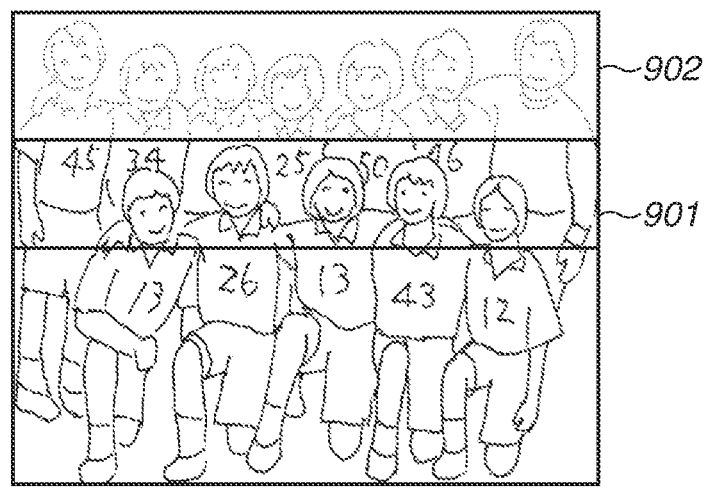
FIG. 9 is a diagram illustrating a process according to a third exemplary embodiment.

For example, in a case where there are subjects along a depth direction as illustrated in FIG. 9, subjects 902 in the depth direction may become out of focus if subjects 901 at the front on the near side are focused. In this case, after the recognition processing on the subjects 901 at the front is completed, subjects at a next distance (subjects at the back herein) are focused, and then the recognition processing is performed on a target area of the distance information. This thereby becomes possible to perform the determination in a state with increased recognition accuracy of each recognition target. This makes it possible to perform the determination in a state where the recognition accuracy of the recognition target is enhanced.

Figure 10:
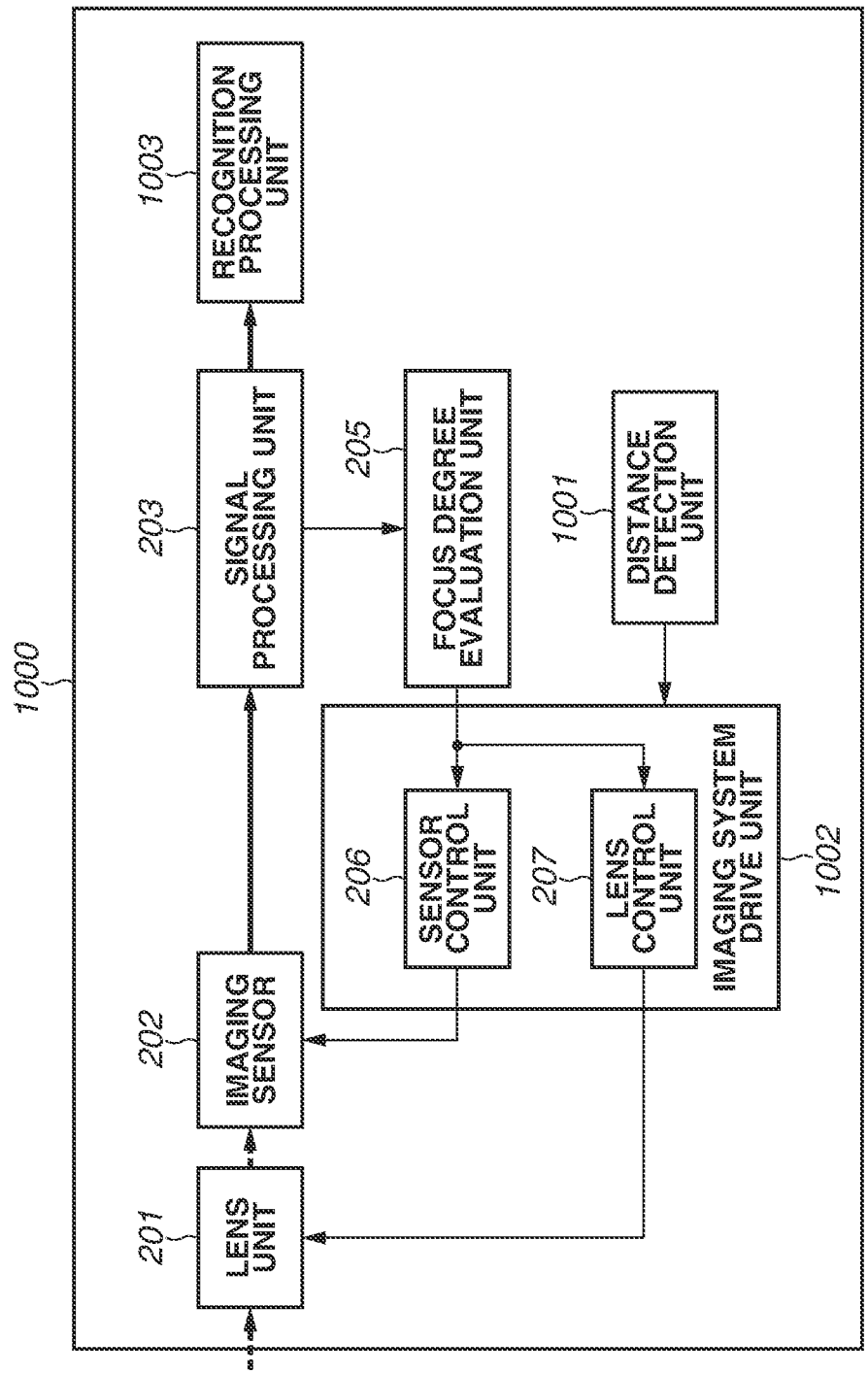
FIG. 10 is a diagram illustrating an example of a functional configuration of an imaging apparatus according to a third exemplary embodiment.

The imaging apparatus according to the third exemplary embodiment has a hardware configuration similar to that of the imaging apparatus according to the first exemplary embodiment, so that redundant descriptions thereof are omitted. FIG. 10 is a block diagram illustrating an example of a functional configuration of an imaging apparatus to which a control apparatus according to the third exemplary embodiment is applied. In FIG. 10, each component having a function similar to that of a component illustrated in FIG. 2 is given the same reference numeral as in FIG. 2, and redundant descriptions thereof are omitted.

The imaging apparatus 1000 includes the lens unit 201, the imaging sensor 202, the signal processing unit 203, the focus degree evaluation unit 205, a distance detection unit 1001, an imaging system drive unit 1002, and a recognition processing unit 1003.

The distance detection unit 1001 detects distances of subjects present in an imaging range of the imaging apparatus 1000. For example, the distance detection unit 1001 detects a distance of a subject based on a focus state of the subject in a captured image and a position of the focus lens. The distance detection unit 1001 can be configured to detect a subject distance using a phase difference sensor, a method using a phase difference in a sensor plane, or a distance measurement device.

The imaging system drive unit 1002 includes the sensor control unit 206 and the lens control unit 207 and drives an imaging system, such as the lens unit 201 and the imaging sensor 202, based on the subject distances detected by the distance detection unit 1001. The imaging system drive unit 1002 is an example of an adjustment unit that adjusts a focus position in imaging. The imaging system drive unit 1002 drives the imaging system and adjusts the focus position based on inputs from the distance detection unit 1001 and the focus degree evaluation unit 205 to change a focused area in the captured image.

The recognition processing unit 1003 performs the subject detection processing on the captured image generated by the signal processing unit 203 to detect target subjects in the captured image. The recognition processing unit 1003 performs the subject detection processing on the captured image generated by the signal processing unit 203 for each detection area in the captured image that is set based on the subject distances detected by the distance detection unit 1001. The recognition processing unit 1003 performs the recognition processing (authentication processing) on subjects detected by the subject detection processing.

Figure 11:
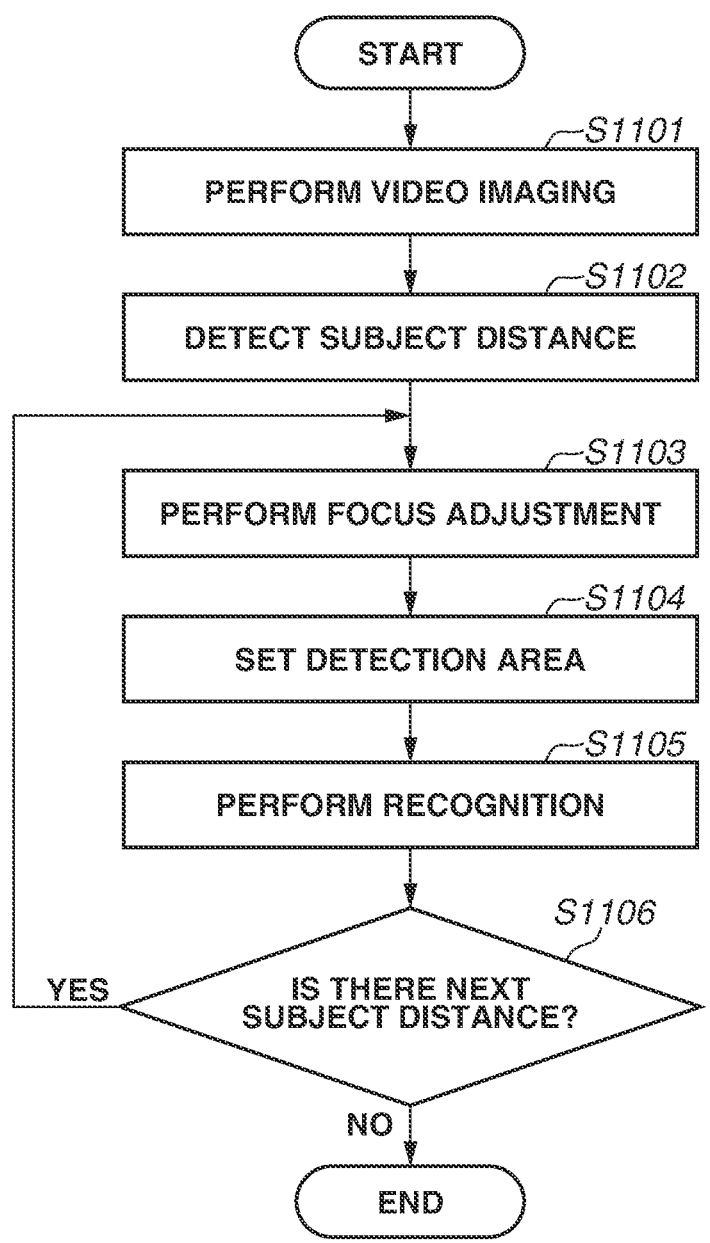
FIG. 11 is a flowchart illustrating an example of a process by the imaging apparatus according to the third exemplary embodiment.

FIG. 11 is a flowchart illustrating an example of a process performed by the imaging apparatus according to the third exemplary embodiment.

In step S1101, the imaging apparatus 1000 starts video imaging. In the imaging apparatus 1000, the imaging sensor 202 photoelectrically converts an optical image formed by the lens unit 201 to generate an imaging signal, and the signal processing unit 203 performs image processing on the generated imaging signal to generate a captured image.

In step S1102, the distance detection unit 1001 detects distances (subject distances) of detection target subjects present in the imaging range of the imaging apparatus 1000.

In step S1103, the imaging system drive unit 1002 drives the imaging system based on the subject distances detected in step S1102 and performs focus adjustment. The imaging system drive unit 1002 drives the imaging system to focus on a selected subject distance among the subject distances detected in step S1102. An adjustment amount of the focus position by the focus adjustment in step S1103 is set based on, for example, hyperfocal distance information obtained from an imaging condition based on the detected subject distances.

In step S1104, the recognition processing unit 1003 sets a subject detection area in the captured image based on the selected subject distance.

In step S1105, the recognition processing unit 1003 performs the subject detection processing on the detection area in the captured image that is set in step S1104, and performs the recognition processing (authentication processing) on subjects detected in the detection processing.

In step S1106 after the processing of step S1105 is ended, the imaging apparatus 1000 determines whether there is a subject distance having not undergone the subject detection processing and the recognition processing. The imaging apparatus 1000 determines whether there is an unselected subject distance among the subject distances detected in step S1102. In a case where the imaging apparatus 1000 determines that there is a next subject distance (YES in step S1106), the processing returns to step S1103. The imaging apparatus 1000 performs the focus adjustment based on the next subject distance and performs the processing of step S1104 and the processing of S1105. In contrast, in a case where the imaging apparatus 1000 determines that there is no next subject distance, i.e., in a case where the imaging apparatus 1000 determines that all the subject distances detected in step S1102 have undergone the subject detection process and the recognition processing (NO in step S1106), the process illustrated in FIG. 11 is ended.

In a case where the subject detection processing and the recognition processing on the captured image are not to be paused, the imaging apparatus 1000 can continue to perform the detection and the recognition in real time by repeatedly performing the process in the flowchart illustrated in FIG. 11.

According to the third exemplary embodiment, while a focus position is changed based on distances of subjects present in the imaging range of the imaging apparatus 1000, a well-focused area in a captured image is set as a detection processing target area, and a subject in the captured image is detected. This increases the possibility of detecting a subject that is suitable for authentication processing.

Figure 12:
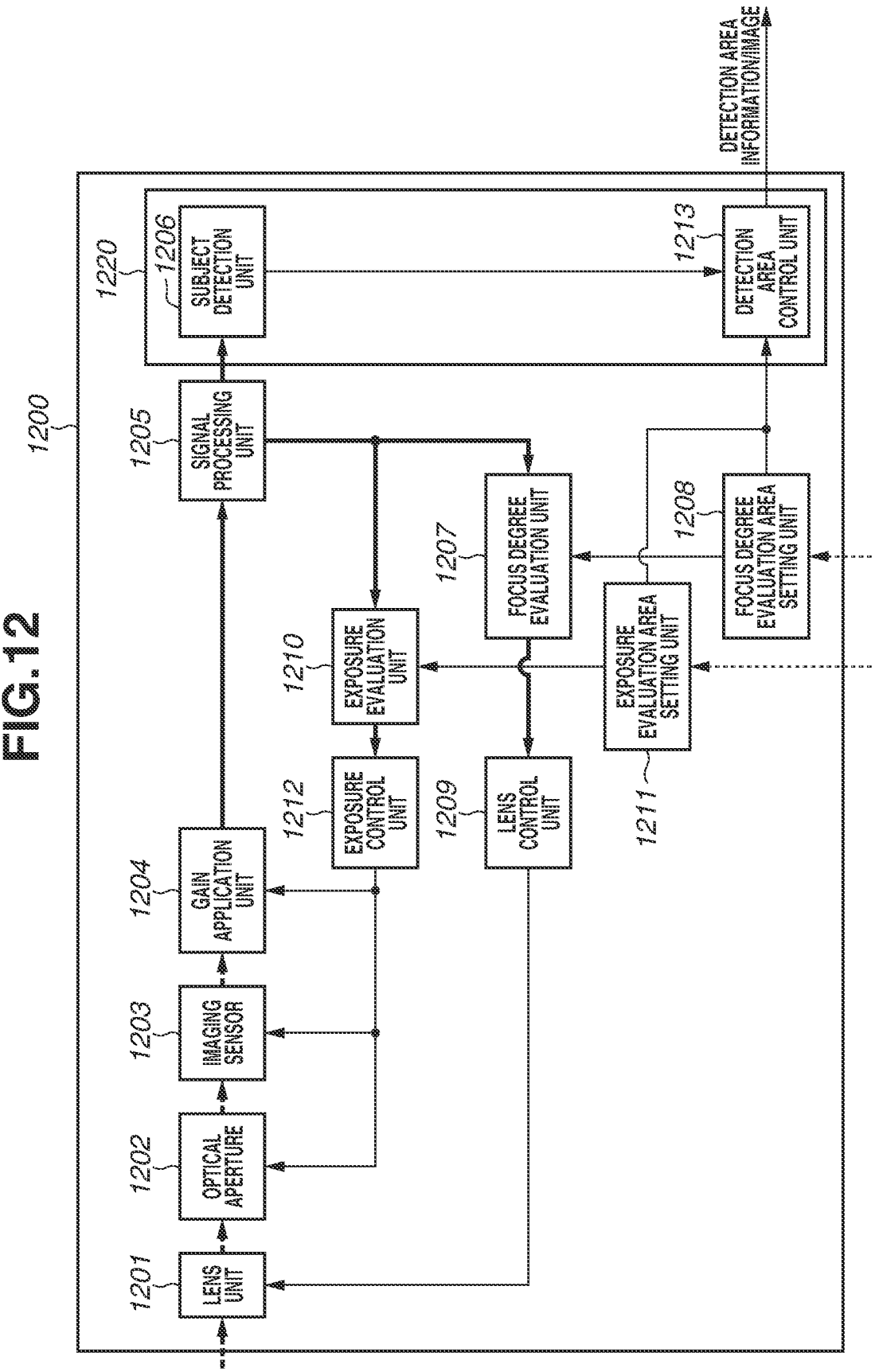
FIG. 12 is a diagram illustrating an example of a functional configuration of an imaging apparatus according to a fourth exemplary embodiment.

In a fourth exemplary embodiment, an example will be described where a subject detection area is selected based on a camera setting of an imaging apparatus in imaging. The imaging apparatus according to the fourth exemplary embodiment has a hardware configuration similar to that of the imaging apparatus according to the first exemplary embodiment, so that redundant descriptions thereof are omitted. FIG. 12 is a block diagram illustrating an example of a functional configuration of an imaging apparatus to which a control apparatus according to the fourth exemplary embodiment is applied. The imaging apparatus 1200 includes a lens unit 1201, an optical aperture 1202, an imaging sensor 1203, a gain application unit 1204, a signal processing unit 1205, and a subject detection unit 1206. The imaging apparatus 1200 further includes a focus degree evaluation unit 1207, a focus degree evaluation area setting unit 1208, a lens control unit 1209, an exposure evaluation unit 1210, an exposure evaluation area setting unit 1211, an exposure control unit 1212, and a detection area control unit 1213.

The lens unit 1201 includes a focus lens and a zoom lens and converges incident light from a subject. The optical aperture 1202 adjusts an amount of light entering the imaging sensor 1203.

Light from a subject entering the imaging apparatus 1200 is formed on an image sensing surface of the imaging sensor 1203 via the lens unit 1201 and the optical aperture 1202.

The imaging sensor 1203 is an image sensor, such as a CMOS sensor or a CCD sensor, that converts light into an electric signal and generates an imaging signal. The gain application unit 1204 applies sensitivity and exposure gains to the imaging signal generated by the imaging sensor 1203. The signal processing unit 1205 performs various types of signal processing and image processing on the imaging signal output from the gain application unit 1204 and generates an image (captured image). The signal processing unit 1205 can be formed using a dedicated circuit block (e.g., a video image engine) for performing predetermined image processing.

The subject detection unit 1206 performs the subject detection processing on the captured image generated by the signal processing unit 1205 to detect target subjects in the captured image and outputs a detection result to the detection area control unit 1213. The detection result output by the subject detection unit 204 includes, for example, information indicating a detected subject area (e.g., coordinate information for identifying the subject area). The subject detection can be performed using an existing publicly known method, such as a subject detection method using template matching or deep learning. According to the present exemplary embodiment, as an example, faces are detection target subjects, and the subject detection unit 1206 performs face detection.

The focus degree evaluation unit 1207 evaluates focus degrees in the captured image generated by the signal processing unit 1205. The focus degree evaluation unit 1207 performs focus degree evaluation in the evaluation area based on settings of an evaluation area (e.g., evaluation frame) set by the focus degree evaluation area setting unit 1208. The focus degree evaluation area setting unit 1208 sets a focus degree evaluation area in the captured image for performing autofocus (AF) control in the imaging apparatus 1200. The lens control unit 1209 controls the lens unit 1201 based on the evaluation results by the focus degree evaluation unit 1207.

The exposure evaluation unit 1210 performs exposure evaluation on the captured image generated by the signal processing unit 1205. The exposure evaluation unit 1210 performs exposure evaluation on an evaluation area (e.g., evaluation frame) set by the exposure evaluation area setting unit 1211 to evaluate an exposure in the evaluation area. The exposure evaluation area setting unit 1211 sets an exposure evaluation area in the captured image for performing automatic exposure (AE) control by using the imaging apparatus 1200. The exposure control unit 1212 controls the optical aperture 1202, the imaging sensor 1203, and the gain application unit 1204 based on the evaluation results performed by the exposure evaluation unit 1210.

The detection area control unit 1213 selects a subject detection area, based on the result of the subject detection on the captured image from the subject detection unit 1206 and settings of the evaluation areas performed by the focus degree evaluation area setting unit 1208 and the exposure evaluation area setting unit 1211. The detection area control unit 1213 outputs detection area information specifying the selected subject detection area, together with the image. For example, the detection area control unit 1213 selects subject areas specified by the detection results, preferentially from the neighborhood of the set evaluation areas without exceeding a predetermined number, selects a subject detection area, and outputs detection area information.

The imaging apparatus according to the fourth exemplary embodiment selects a detected subject area preferentially from the neighborhood of set evaluation areas based on the camera setting in imaging, such as the evaluation area setting related to AF control and the evaluation area setting related to AE control. This makes it possible to preferentially select, as a subject detection area, a subject area from the neighborhood of the evaluation areas where appropriate image quality can be achieved, and the possibility of detecting a subject that is more suitable for authentication processing increases.

In the above-described configuration, the imaging apparatus 1200 includes the subject detection unit 1206 and the detection area control unit 1213, as an example. However, this is not a limiting configuration. For example, the imaging apparatus 1200 can include, as a subject detection apparatus 1220, the subject detection unit 1206 and the detection area control unit 1213 that are capable of communicating with the imaging apparatus 1200. Alternatively, the subject detection apparatus 1220 can include the focus degree evaluation area setting unit 1208 and the exposure evaluation area setting unit 1211.

While faces of persons are detection target subjects in the above-described examples according to the exemplary embodiments, this is not a limitation. Other subjects are also applicable as an object, such as a vehicle or an item, that can be a detection target. The exemplary embodiments are also applicable to not only an imaging apparatus having only an imaging function, such as a camera, but also a smartphone or a tablet terminal having an imaging function. While mainly the examples in which the imaging apparatus 100 performs the processes in the flowcharts illustrated in FIGS. 7 and 11 according to the exemplary embodiments are described above, this is not a limitation. For example, a control apparatus including the hardware components illustrated in FIG. 1 excluding the imaging unit 106 can perform the processes in the flowcharts. Alternatively, the control apparatus can connect to the imaging apparatus 100 to perform lens control based on the focus degree evaluation results.

The present disclosure can also be realized by a process in which a program that realizes one or more functions of the above-described exemplary embodiments are supplied to a system or an apparatus via a network or a storage medium and one or more processors of a computer of the system or the apparatus read the program and execute the read program. The present disclosure can also be realized by a circuit (e.g., application-specific integrated circuit (ASIC)) that realizes one or more functions.

All of the above-described exemplary embodiments merely illustrate examples of concretization in implementing the present disclosure, and the technical scope of the present disclosure should not be interpreted narrowly based on the exemplary embodiments. Specifically, the present disclosure can be implemented in various forms without departing from the technical concept or major features of the present disclosure.

The present disclosure increases the possibility of detecting a suitable subject for authentication processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-014771, filed Feb. 2, 2023, which is hereby incorporated by reference herein in its entirety.

What is claimed is:

1. A control apparatus comprising:
one or more memories storing instructions; and
one or more processors that, upon execution of the stored instructions, are configured to:
perform determination processing to determine a focus degree of each of two or more partial areas in a captured image acquired by a camera; and
select, based on the determined focus degree of each of the two or more partial areas, a subject detection area in the captured image acquired by the camera,
wherein the one or more processors are further configured to perform adjustment processing to adjust a focus position of the camera,
wherein, based on distance information about a subject detected from the captured image, the one or more processors are configured to change the focus position in the adjustment processing, and change the subject detection area, and
wherein the one or more processors are configured to set an adjustment amount of the focus position by the adjustment processing based on hyperfocal distance information obtained from an imaging condition based on the distance information about the subject.

2. The control apparatus according to claim 1, wherein, in the determination processing, the one or more processors are configured to divide an imaging area of the camera into a plurality of partial areas of a predetermined size, and determine a focus degree of each partial area.

3. The control apparatus according to claim 1,
wherein the one or more processors are further configured to perform detection processing to detect a subject from an image, and
wherein, in the determination processing, the one or more processors are configured to detect a focus degree of a partial area in the captured image that corresponds to the subject detected by the detection processing.

4. The control apparatus according to claim 1,
wherein the one or more processors are further configured to perform setting processing to set a priority related to the selection of the subject detection area, and
wherein the one or more processors are configured to select the subject detection area in the captured image based on the focus degree of each partial area that is determined by the determination processing and the priority set by the setting processing.

5. The control apparatus according to claim 4, wherein the one or more processors are configured to select the subject detection area in the captured image based on a result of subject detection in the captured image and the focus degree of each partial area in the captured image that is weighted based on the priority.

6. The control apparatus according to claim 1, wherein, in the determination processing, the one or more processors are configured to detect the focus degree in the image based on at least one of a contrast value, the distance information about the subject, a pattern matching degree, and attribute information about a detection target object.

7. The control apparatus according to claim 1, wherein, in a case where detection processing of detecting one or more subjects including a first subject in a first detection area corresponding to distance information about the first subject is completed, the one or more processors are configured to change the focus position of the camera to a second focus position which is based on distance information about a second subject in the adjustment processing.

8. The control apparatus according to claim 1, wherein the one or more processors are configured to perform detection area control processing to select the subject detection area based further on a camera setting of the camera in performing imaging.

9. The control apparatus according to claim 8, wherein the camera setting is at least one of a setting of an evaluation area related to autofocus control and a setting of an evaluation area related to automatic exposure control.

10. The control apparatus according to claim 1, further comprising the camera.

11. The control apparatus according to claim 1, wherein the one or more processors are configured to perform authentication processing on a subject detected from the subject detection area.

12. A control method that a control apparatus performs, the control method comprising:
  determining a focus degree of each of two or more partial areas in a captured image acquired by a camera;
  selecting, based on the determined focus degree of each of the two or more partial areas, a subject detection area in the captured image acquired by the camera;
  performing adjustment processing to adjust a focus position of the camera,
  changing, based on distance information about a subject detected from the captured image, the focus position in the adjustment processing, and change the subject detection area; and
  setting an adjustment amount of the focus position by the adjustment processing based on hyperfocal distance information obtained from an imaging condition based on the distance information about the subject.

13. A non-transitory computer-readable storage medium that stores a program for causing a computer to:
  determine a focus degree of each of two or more partial areas in a captured image acquired by a camera;
  select, based on the determined focus degree of each of the two or more partial areas, a subject detection area in the captured image acquired by the camera;
  perform adjustment processing to adjust a focus position of the camera,
  change, based on distance information about a subject detected from the captured image, the focus position in the adjustment processing, and change the subject detection area; and
  set an adjustment amount of the focus position by the adjustment processing based on hyperfocal distance information obtained from an imaging condition based on the distance information about the subject.

* * * * *